United States Patent [19]

Heinzl et al.

[11] 4,158,847

[45] Jun. 19, 1979

[54] PIEZOELECTRIC OPERATED PRINTER HEAD FOR INK-OPERATED MOSAIC PRINTER UNITS

[75] Inventors: Joachim Heinzl; Erich Kattner, both of Munich, Fed. Rep. of Germany

[73] Assignee: Siemens Aktiengesellschaft, Berlin & Munich, Fed. Rep. of Germany

[21] Appl. No.: 893,614

[22] Filed: Apr. 5, 1978

Related U.S. Application Data

[63] Continuation of Ser. No. 727,038, Sep. 27, 1976, abandoned.

[30] Foreign Application Priority Data

Sep. 9, 1975 [DE] Fed. Rep. of Germany ....... 2543451

[51] Int. Cl.$^{2}$ .......................... G01D 15/16; B41J 3/04

[52] U.S. Cl. ................................ 346/140 R; 400/126

[58] Field of Search .............. 346/140 R, 75; 400/126

[56] References Cited

U.S. PATENT DOCUMENTS

| | | | |
|---|---|---|---|
| 2,573,143 | 10/1951 | Jacob | 346/75 |
| 3,683,212 | 8/1972 | Zoltan | 346/140 R X |
| 3,708,798 | 1/1973 | Hildenbrand | 346/140 R |
| 3,869,986 | 3/1975 | Hubbard | 346/140 R X |
| 3,953,862 | 4/1976 | Amberntsson | 346/140 R |
| 4,005,440 | 1/1977 | Amberntsson | 346/140 R |

*Primary Examiner*—Joseph W. Hartary

*Attorney, Agent, or Firm*—Hill, Van Santen, Steadman, Chiara & Simpson

[57] ABSTRACT

A piezoelectrically operated printer head for an ink-jet printing unit characterized by the printer head having a body with a plurality of printing jets arranged in a pattern at a printing location, each printing jet comprising an individual passage extending through the body from an orifice at the printing location to a source of printing liquid. Each passage has a first segment of its length surrounded by a cylindrical piezoelectric drive so that a drop of the printing liquid is ejected from the jet by a piezoelectric contraction of the drive element and each of the passages has a second segment of its length spacing the first segment from the respective orifice. The second segments of the passages are disposed in the body of the printer head to extend away from the pattern of orifices at the printing location in a radiating pattern without any kinks therein.

10 Claims, 3 Drawing Figures

PIEZOELECTRIC OPERATED PRINTER HEAD FOR INK-OPERATED MOSAIC PRINTER UNITS

This is a continuation of application Ser. No. 727,038, filed Sept. 27, 1976, now abandoned.

BACKGROUND OF THE INVENTION

1. Field of the Invention

The present invention is directed to a piezoelectrically operated head for ink-jet printer units having printing jets in which a printing liquid contained in a compression chamber which is surrounded by a cylindrical piezoelectric drive element is ejected in a droplet fashion by a piezoelectric contraction of the drive element.

2. Prior Art

An electrically operated printing unit in which a printing jet is made to execute mechanical vibrations by means of a piezoelectric drive element to eject printing liquid in droplet form is disclosed in U.S. Pat. No. 3,298,030. After each droplet of printing liquid or ink is ejected from the jet, the droplet is deflected to one of several different positions by an electrical field to form characters on a recording medium and the amount of deflection of each droplet is controlled by a character generator.

In order for this type of printing unit to achieve an adequate high printing speed along with sufficient ink saturation on the parts of the characters being recorded, the frequency of release of the individual droplets of ink must be extremely high. Due to this extremely high release frequency, the overall unit is relatively highly susceptible to breakdowns. Also, since the printing device must synchronize each individual droplet with the associated deflection voltage, the synchronizing devices, which are required, are also susceptible to breakdowns.

In order to overcome the above-mentioned drawbacks, several printing units have been combined to form a single printer head as disclosed in German Offenlegungsschrift No. 2,262,106. In this device, the single head is moved in a manner of a mosaic printer head in a line fashion along a data carrier with each grid point being assigned a piezoelectrically operated printing jet. In this particular device, a piezoelectric crystal transducer acts upon a diaphragm to develop a requisite pressure in a compression chamber to cause the release of an ink droplet. However, with this device, special design difficulties are created.

These difficulties result from the physical dimensions of the individual piezoelectrically operated jets and their drive arrangements which must be grouped together in accordance with the size of the printing grid. The frequent changes, which occur in the printing operation between the phases of acceleration and deceleration, for example a start-stop operation, also requires that the overall printer head must have the lowest possible mass.

SUMMARY OF THE INVENTION

The present invention is directed to providing a piezoelectrically operated printer head for an ink operated mosaic printing unit which head accommodates a plurality of printing jets and maintains the external dimensions and mass of the head at the lowest possible value or figure. The overall printer head is a simple and inexpensive construction which is easy to service and should in particular be insensitive to pressure fluctuations in the ink supply system.

In order to achieve these tasks, the invention is directed to an improvement in a piezoelectrically operated printer head for an ink-ket printer unit with printing jets, each printing jet having a compression chamber containing a printing liquid and being cylindrically surrounded by a cylindrical piezoelectric drive element so that a droplet of printing liquid is ejected by a piezoelectric contraction of the drive element. The improvement comprises the printer head having a body with a plurality of printing jets arranged in a pattern at a printing location on one surface of the head, each printing jet comprising an individual passage extending in a straight line through the body of the head from an orifice at the printing location to a source of printing liquid, each passage having a first segment of its length surrounded by a cylindrical piezoelectric drive element, each first segment being spaced from the printing location by a second segment of the passage, said second segments of the passages being disposed in the body of the printer head to extend away from the pattern of orifices at the printing location in a radiating pattern without any kinks therein.

Preferably, the body of the printer is produced by a method of providing a mold having a mold cavity of the shape of the body, inserting a plurality of pins in the mold cavity extending radially from a wall, each of said pin supporting a cylindrical piezoelectric drive element, casting a material of the body in the mold cavity to surround the pins and the piezoelectric drive elements, and then withdrawing the pins from the cast body to form the passages for each of the printing jets. The method provides in situ casting of the drive elements in the body during the formation of the passages.

Through the method of manufacture and the structure of the printer head of the present invention, it is possible to design the printer head with the requisite closely spaced jet orifice grid interval for character formation and to manufacture the printer head in a simple fashion using casing techniques. Since no relative movement can occur between the printing jets and since relative movement between the jets would impair the print quality, the printer head of the present invention is particularly robust vis-a-vis mechanical effects. The overall printer head, which has a very low mass, is highly resistant to breakdowns and is also wear resistant.

In a further preferred embodiment, the ink passage orifices disposed in front of a data carrier are closed off by a plate which has parallel jet bores that correspond in number to the number of ink passages. This plate is preferably detachably mounted to the body of the printer head and can, therefore, if required, be exchanged or very quickly cleaned. At the same time, the plate enables an effective matching of the size of the printing jet bores to the particular data carrier on which printing is to be accomplished.

In order to render the printer head particularly insensitive to pressure fluctuations in the printing liquid or ink supply system, a further advantageous embodiment of the invention has all of the ink passages being supplied with ink through a common capillary filter device. Accordingly, there is no longer any need to provide a special filter in each ink passage and the filter can be made in one piece and fitted onto the body of the printer head. The capillary filter device comprises a throttle plate of synthetic material containing a narrow opening or bore for each of the passages of the printer head and a close mesh grid which is disposed between the throttle plate and the ink passages of the body. During start-stop operations, these narrow bores of the throttle plate prevent pressure fluctuations, which develop in a distributor device that is attached to the body of the printer head, from having any effect on the printing jets. The close mesh grid in turn serves as a non-return device so that with a penetration of air into the ink passages, there is no risk of the entire ink supply running empty.

DESCRIPTION OF THE PREFERRED EMBODIMENT

Figure 1:
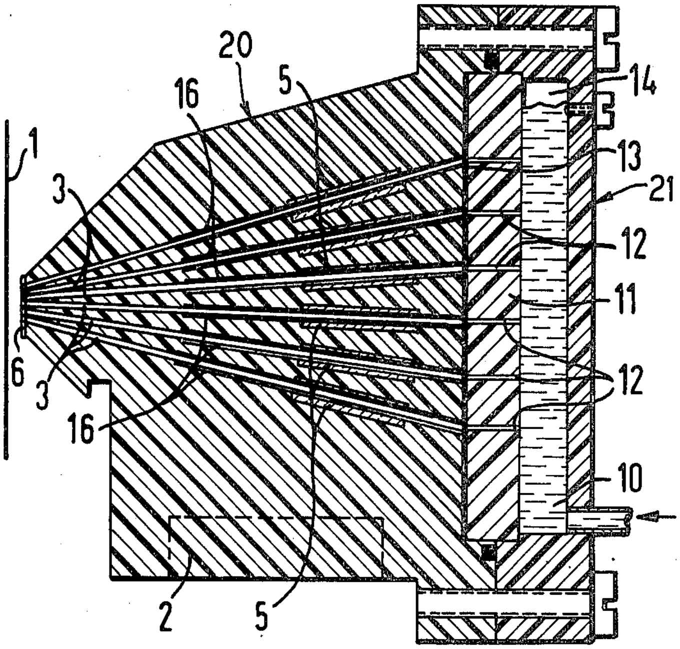
FIG. 1 is a cross-sectional view through a printer head for an ink operated mosaic printing unit in accordance with the present invention.
Figure 2:
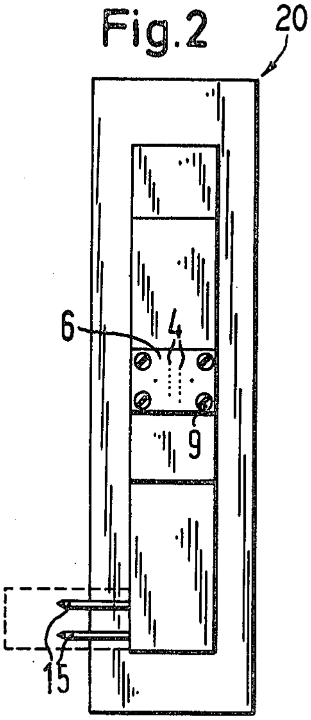
FIG. 2 is a front elevational view of the printer head of FIG. 1.

The principles of the present invention are particularly useful in a piezoelectrically operated printer head generally indicated at 20 in FIGS. 1 and 2. The printer head 20 is moved in a line fashion along a data carrier 1 by means of a conventional mechanism (not shown) and at the same time, it is driven in a character-dependent fashion by means of a conventional character generator (not shown).

The printer head 20 has a body 2 which consists of a single member in the form of a cast component of dielectric synthetic material containing several straight passages 3 designed to receive a printing liquid or ink from an ink supply system generally indicated at 21. These passages are ink passages and are tapered conically at one end to terminate in discharge orifices 4 which are arranged in a pattern of two rows to direct ink toward the data carrier 1. The other end of each of the ink passages 3 is in communication through a restricted feeder with the ink supply system 21. These ink passages 3 are arranged within the body 2 of the printer head in such a fashion that they radiate away from the printing location in a straight line, spoke-like fashion and without any kinks. The passages 3 form two levels or columns which in turn are arranged at an angle to one another so that the orifices 4, as illustrated in FIG. 2, form two columns or vertical rows. This kind of an arrangement, which is necessary in order to form a mosaic printer head, is made possible by virtue of the fact that a separate piezoelectric drive element 5, which consists of a ceramic tube, cylindrically surrounds a first segment of each ink passage 3 and that the drive elements 5 are spaced at such an interval from the actual discharge orifices 4 that they do not physically intefere with one another.

Figure 3:
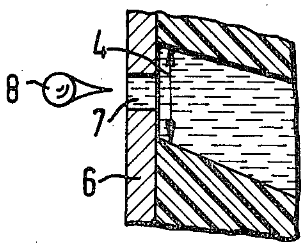
FIG. 3 is an enlarged fragmental cross-sectional view of a jet plate of the present invention.

Preferably, the discharge orifices 4 of the ink passages 3 are sealed by a jet plate 6 which has parallel jet bores 7 with one bore associated with each orifice 4 of the ink passages 3 (see FIG. 3). By virtue of their shape, these bores 7 determine the size of an ink droplet 8, which is ejected from the ink passages 3, and will determine their direction of ejection. The jet plate 6 is a metal plate in which the narrow jet bores 7 are formed either by means of laser beams or by using electro-erosion techniques. Since known electro-erosion type procedures or techniques comprise coarsely etching out each of the bores and then reducing its size by a subsequent nickle-plating operation, the electro-erosion type procedure is particularly advantageous. By means of this process, burr-free parallel opening of a kind which are particularly suitable for a jet-ink printing operation are achieved. The plate 6 is attached in an interchangeable fashion to the printer head body 2 by means of screws 9 which allow the plate to be removed for cleaning or replacement with a plate having different size bores.

The ink supply system 21 includes an ink distributor device 10 which is attached to the body 2 on a side opposite the plate 6 so that each of the ink passages 3 is connected to the supply of ink through a capillary filter device which prevents interference between the individual drive elements 5 associated with each passage. At the same time, the capillary filter device ensures that pressure fluctuations, which develop in the ink supply system 21, cannot have any effect on the individual drive elements 5.

The capillary filter device includes a throttle plate 11, which is a casting of synthetic material and is provided with a number of ink passages 12 which correspond to the passages 3 and have a diameter of around 350 $\mu$m. Due to these openings 12, pressure peaks in the ink supply system, which pressure peaks may be produced, for example by acceleration and deceleration forces acting upon the printer head, are cancelled. Between the throttle plate 11 and the ink passages 3, there is a close mesh grid 13 of steel or synthetic material. The grid 13 extends over the full area of the throttle plate 11 and has a mesh size of around 35 $\mu$m which is of the order required to produce a capillary action. This grid 13 also acts as a non-return device to prevent the penetration of air through the ink passages 3 into the ink supply system 21. In order to further dampen the pressure fluctuations developing in the ink supply system 21 during a start-stop operation, the distributor device 10 in a manner known per se includes an air bubble 14.

During a printing operation, each drive element 5 is driven via a plug-in contact 15, which is cast in situ in the printer head 2, by a character generator (not illustrated). To this end, each of the drive elements 5 has a ceramic tube which is provided with an external metal layer acting as an electrode and the mating electrode is formed as a protective tube 16 telescopically arranged inside of the ceramic tube forming the drive element. This protective tube 16 is electrically conductive and is fixed by an electrically conductive adhesive to the ceramic tube. Due to its absolute impermeability to ink, the tube 16 acts to prevent ink from penetrating into the ceramic tube and producing a short circuit therein. Each individual drive element 5 is so operated that the pulse, which leads to the contraction in the drive element 5 which contraction causes the ejection of an ink droplet, are applied to the external electrode of the ceramic tube forming the drive element 5 and the protective tube 16, which is the internal electrode, is permanently grounded. With this kind of application of potential, the insulation between the protective tube 16 which acts an an internal electrode and the ink can be dispensed with and between the ink and the ceramic tube forming the drive element 5, no capacitance of the kind which would effect the drive function can develop.

In the printer head in accordance with the present invention, the ceramic tube forming the drive element 5 is preferably provided with dimensions so that the quotient of the wall thickness and mean diameter of the tube is equal to the Poisson's ratio of the ceramic material of the tube. With this kind of dimensioning of the drive element 5, the piezoelectric excitation causes only the internal diameter of the ceramic tube to change while the external diameter remains the same. Thus, the drive element 5 is ideally suited for the casting produced by which the printer head is manufactured. Since the external diameter of the drive element 5 does not change, the drive element 5 cannot become detached from the surrounded dielectric material even during lengthy printing operations. Furthermore, since there are not contractions of the outer diameter of the ceramic tube forming the drive element 5, no damaging mechanical stresses can develop between the drive element 5 and the surrounding dielectric material, and the full deformation energy of the drive element is passed to the ink contained in the ink passages 3 and is thus entirely available at the jet plate 6.

As previously mentioned, the body 2 of the printer head can be produced in a simple fashion by a casting operation in a mold. The ceramic tubes forming each of the drive elements 5 are telescopically received on the protective tubes 16 and prior to casting are slipped over metal mandrels or pins which are introduced into the casting mold with the drive elements thereon. After the dielectric synthetic material, which was cast, has hardened, the pins or mandrels are removed. The resultant straight cavities 3 act as the compression chamber for the drive element and the ink passages. At the same time as the drive elements 5 are inserted in the mold, the leads required to drive the individual elements along with the associated plug-in contact 15 are inserted in the mold prior to the casting of the dielectric synthetic material. Therefore, the leads for the drive elements 5 along with the plug-in contact 15 are cast in situ with the drive elements.

Although various minor modifications may be suggested by those versed in the art, it should be understood that we wish to employ within the scope of the patent warranted hereon, all such modifications as reasonably and properly come within the scope of our contribution to the art.

We claim:

1. In a piezoelectrically operated printer head for an ink-jet printing unit with printing jets, each printing jet having a compression chamber containing a printing liquid and being cylindrically surrounded by a cylindrical piezoelectric drive element so that a droplet of printing liquid is ejected by a piezoelectric contraction of the drive element, the improvement comprising the printer head having a body with a plurality of printing jets arranged in a pattern at a printing location on one surface of the head, a common ink supply distributor carried on said head, each printing jet comprising an individual passage extending in a straight line through the body from an orifice at the printing location to said common ink supply distributor, each passage having a first segment of its length surrounded by a cylindrical piezoelectric drive element, said first segments being spaced from the printing location by a second segment of the passage, said passages being disposed in the printer head to extend away from the pattern of orifices at the printing location in a radiating pattern without any kinks therein so that the pattern of jet orifices has the required close spacing without the piezoelectric drive elements of adjacent passages being in physical interference with each other.

2. In a piezoelectrically operated printer head according to claim 1, wherein all of the passages of the jets are in communication with said ink supply distributor through a common capillary filter device.

3. In a piezoelectrically operated printer head according to claim 1, which includes a plate having a plurality of jet bores corresponding in number to the number of ink passages, said plate being disposed at the printing location and forming jet orifices for the printing jets.

4. In a piezoelectrically operated printer head according to claim 3, wherein said plate is detachably mounted on the body of the printer head.

5. In a piezoelectrically operated printer head according to claim 1, wherein the body of the printer head is a single cast body with said drive elements being cast in situ therein.

6. In a piezoelectrically operated printer head according to claim 5, wherein the body consists of a dielectric synthetic material.

7. In a piezoelectrically operated printer head according to claim 5, which includes a plug-in contact for each of the drive elements cast in situ in the body.

8. In a piezoelectrically operated printer head for an ink-jet printing unit with printing jets, each printing jet having a compression chamber containing a printing liquid and being cylindrically surrounded by a cylindrical piezoelectric drive element so that a droplet of printing liquid is ejected by a piezoelectric contraction of the drive element, the improvement comprising the printer head having a body with a plurality of printing jets arranged in a pattern at a printing location on one surface of the head, each printing jet comprising an individual passage extending through the body from an orifice at the printing location to a source of printing liquid, each passage having a first segment of its length surrounded by a cylindrical piezoelectric drive element, said first segments being spaced from the printing location by a second segment of the passage, said second segments of the passages being disposed in the printer head to extend away from a pattern of orifices at the printing location in a radiating pattern without any kinks therein, and a common ink supply distributor carried on said printer head for supplying ink to each of said passages, said ink supply distributor being in communication with said passages by a common capillary filter device comprising a throttle plate containing a narrow opening for each of the passages of the body and a close mesh grid disposed between the throttle plate and the ink passages of the body.

9. A method of forming a printer head body for use in an ink-jet printer unit having a plurality of printing jets, each printing jet having a straight passage in a body extending in a straight line from an orifice at a printing location to a common ink supply distributor in the body, each passage having a first segment of its length surrounded by a cylindrical piezoelectric drive element to form a compression chamber containing a printing liquid so that a droplet of printing liquid is ejected by a piezoelectric contraction of the drive element, and each first segment of the passage being spaced from the orifice of the passage by a second segment of its length, said passages being disposed in the body of the printer head to extend in a straight line away from the pattern of orifices at the printing location in a radiating pattern without any kinks therein, said method comprising providing a mold having a mold cavity of the shape of the body of the printer head, inserting a plurality of pins in the mold cavity extending radially from one wall, each of said pins supporting a cylindrical piezoelectric drive element, casting a material of the body in the mold cavity to surround the pins and the piezoelectric drive elements, and then withdrawing the pins from the cast body to form the straight passages for each of the printing jets.

10. A method of forming a printer head body according to claim 9, wherein the step of inserting the pins includes inserting a plug-in contact for each of the drive elements, said plug-in contacts being connected to electrodes of the drive elements so that the plug-in contacts are cast in situ with the drive elements.

* * * * *